(12) United States Patent
Chang

(10) Patent No.: US 7,503,782 B2
(45) Date of Patent: Mar. 17, 2009

(54) CARD CONNECTOR

(75) Inventor: Wei-Cheng Chang, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/888,115

(22) Filed: Jul. 31, 2007

(65) Prior Publication Data
US 2008/0026619 A1    Jan. 31, 2008

(30) Foreign Application Priority Data
Jul. 31, 2006    (TW) .................................. 95213428

(51) Int. Cl.
*H01R 13/62* (2006.01)
(52) U.S. Cl. ....................................................... 439/159
(58) Field of Classification Search ................ 439/188, 439/159, 157, 152, 630; 235/486
See application file for complete search history.

(56) References Cited
U.S. PATENT DOCUMENTS
6,361,338 B1 * 3/2002 Chang ........................ 439/159

6,520,783 B2 * 2/2003 Hsu ........................... 439/157
6,709,281 B2   3/2004 Shishikura et al.
6,866,530 B1   3/2005 Yen-Lin FOREIGN PATENT DOCUMENTS
JP    2005-108764    * 4/2005    .................. 439/630

* cited by examiner

*Primary Examiner*—Alexander Gilman
(74) *Attorney, Agent, or Firm*—Wei Te Chung

(57) ABSTRACT

A card connector comprises an insulative housing (1) receiving a plurality of terminals (4), a shield plate (2) assembled on the insulative housing, an ejector (3) coupled to the insulative housing and a detecting switch assembled on the insulative housing. The ejector comprises a movable slider (32). The slider has a triangular plat (322) is capable of moving along a card inserting direction by the card. The detecting switch has a passive pin (42) and an active pin (43), the active pin has a resilient curved part (422) projecting into a moving track of triangular plate, and the curved part is capable of moving by the triangular plate.

18 Claims, 5 Drawing Sheets

CARD CONNECTOR

BACKGROUND OF THE INVENTION

1. Field of the Invention

The present invention relates to an electrical card connector, and particularly to an electrical card connector with an ejector.

2. Description of Prior Arts

Integrated circuit (IC) cards are connected to other electronic devices electrically in conjunction with corresponding card connectors. In order to contact or cut electrically between IC cards and other equipments accurately and conveniently, the card connectors commonly equip with switches to achieve above-mentioned object.

U.S. Pat. No. 6,709,281 discloses a commonly card connector for receiving an electrical card. The card connector defines a card receiving space and comprises an insulating housing, a plurality of contacts exposed into the card receiving space and arranged on a bottom wall of the insulating housing and a switch. The switch comprise a first piece of metal made from a stationary piece of metal; and a cantilevered second piece of metal having a projecting touching portion, the projecting touching portion can come in contact with the electrical card. With the electrical card sliding to one of two positions: a protect-on position (write inhibit position) and a protect-off position (write enable position), the two metal pieces can be connected or separated structurally and electrically.

However, the switch works depending on directly engaging with the card, accordingly the card is easily attrited by the metal switch often engaging with the card.

Hence, an improved card connector is highly desired to overcome the aforementioned disadvantages of the prior art.

SUMMARY OF THE INVENTION

An object of the present invention is to prevent a card from abrasion.

To achieve the above object, a card connector mounted on a printed circuit board, comprises an insulative housing receiving a plurality of terminals, a shield plate assembled on the insulative housing, an ejector coupled to the insulative housing and a detecting switch assembled on the insulative housing. The shield plate defines a receiving slot with the insulative housing for receiving a card. The ejector comprises a resilient member, a movable slider connecting with the resilient member, and the slider has a triangular plate extending into the receiving slot and is capable of moving along a card inserting direction subject to the card. The detecting switch has a passive pin and an active pin, the active pin has a resilient curved part projecting into a moving track of the triangular plate, and the curved part is capable of moving subject to the triangular plate between an upper position whereat electrically and mechanically connecting with the passive pin and a bottom position whereat electrically and mechanically disconnecting with the passive pin.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Description of the preferred embodiment of this invention, a card connector will be described with reference to FIG. 1-FIG. 5 so as to facilitate better understanding of this invention.

Figure 1:
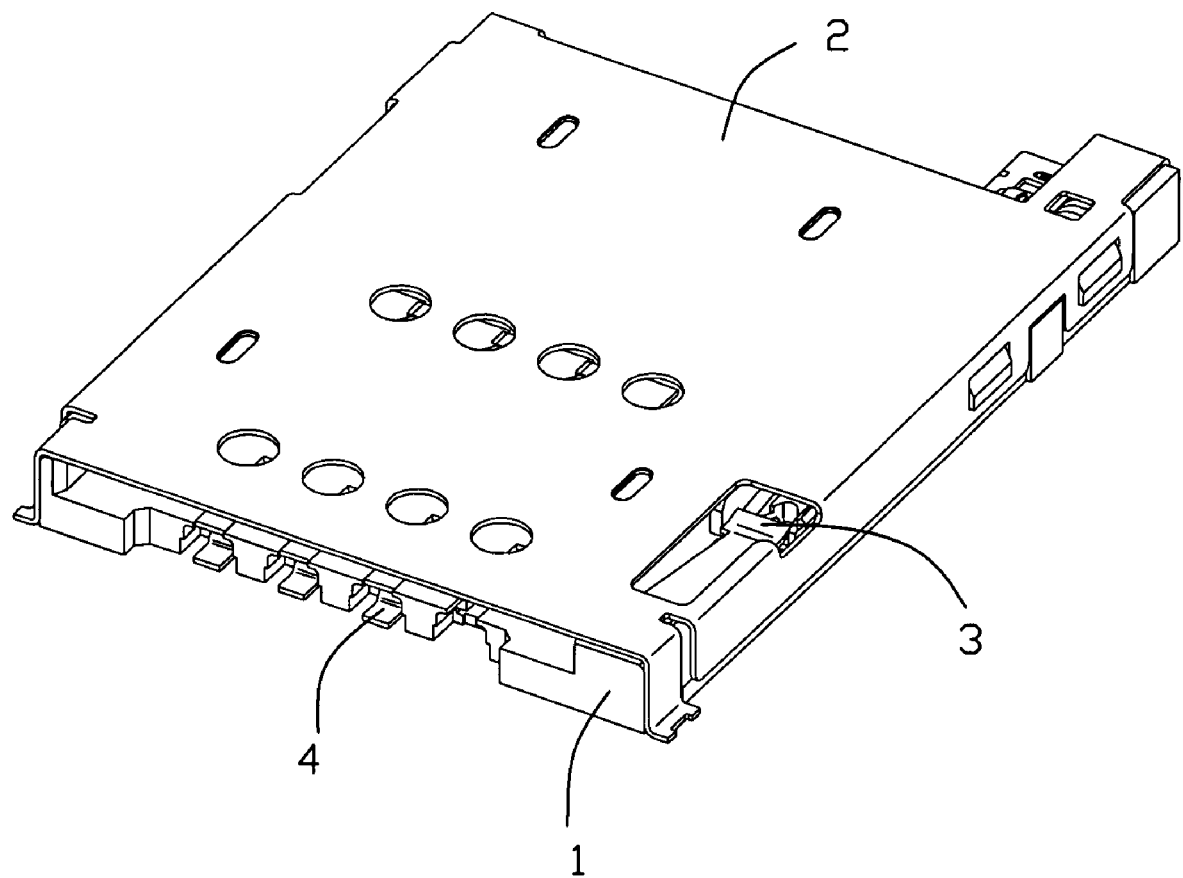
FIG. 1 is an assembled, perspective view of a card connector in accordance with the present invention.

Referring to FIG. 1, the card connector, mounted on a printed circuit board (PCB), shown therein is of a receiving slot 13 for receiving card and is generally used in a notebook computer. The card connector comprises a U-shaped insulating housing 1 with a plurality of terminals 4, a shield plate 2 of stainless steel attached to the insulating housing 1, a detecting switch (not labeled) assembled on the insulative housing 1, and an ejector 3 received in the insulative housing 1. The shield plate 2 is used for protecting the card in the receiving slot 13 from EMI. The detecting switch is used for detecting weather the card is on a right position.

Figure 2:
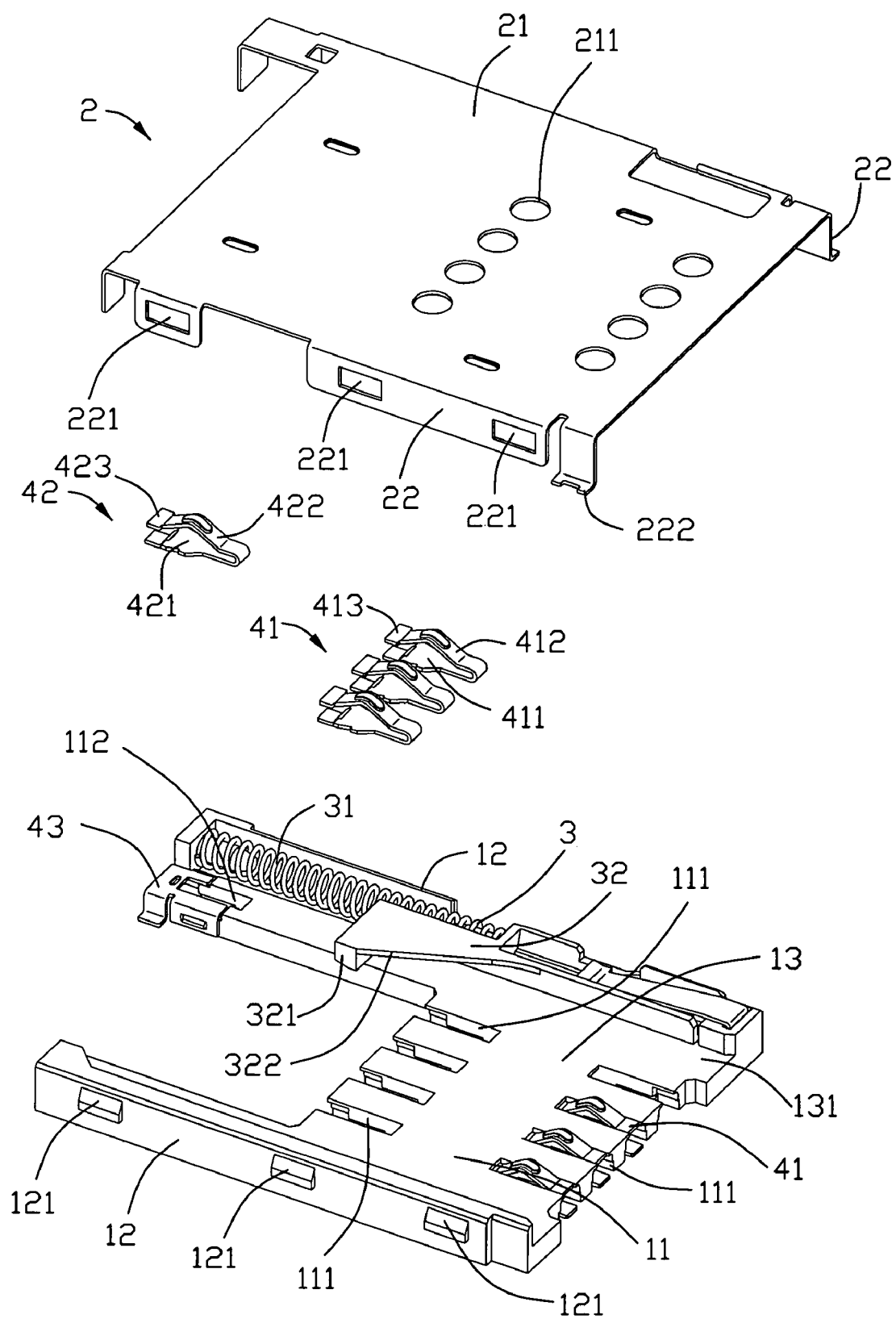
FIG. 2 is an exploded, perspective view of the card connector shown in FIG. 1.

Joining FIG. 2, an exploded, perspective view of the card connector, the housing 1 comprises a U-shaped main body 11 and a pair of supporting arms 12 extending forwardly from the opposite ends of the main body 11. Each of supporting arms 12 defines a plurality of retaining blocks 121 on the outer surface thereof. The receiving slot 13 is surrounded by the supporting arms 12 and the main body 11, and defines an inserting open 131 opposite to main body 11 and sandwiched by the supporting arms 12. The inserting open 131 is provided for guiding the card inserted. The main body 11 comprises a plurality of receiving channels 111 are arranged in two rows thereon and a receiving hole 112 at a distal end of the U-shaped main body 11 adjacent to the inserting open 131.

The shell 2 assembled on the housing 1 comprises a top wall 21 and a pair of lateral walls 12 extending downwardly from the opposite edges of the top wall 11. Each lateral wall 12 defines a plurality of retaining cutouts 221 for locking with corresponding retaining blocks.

Figure 3:
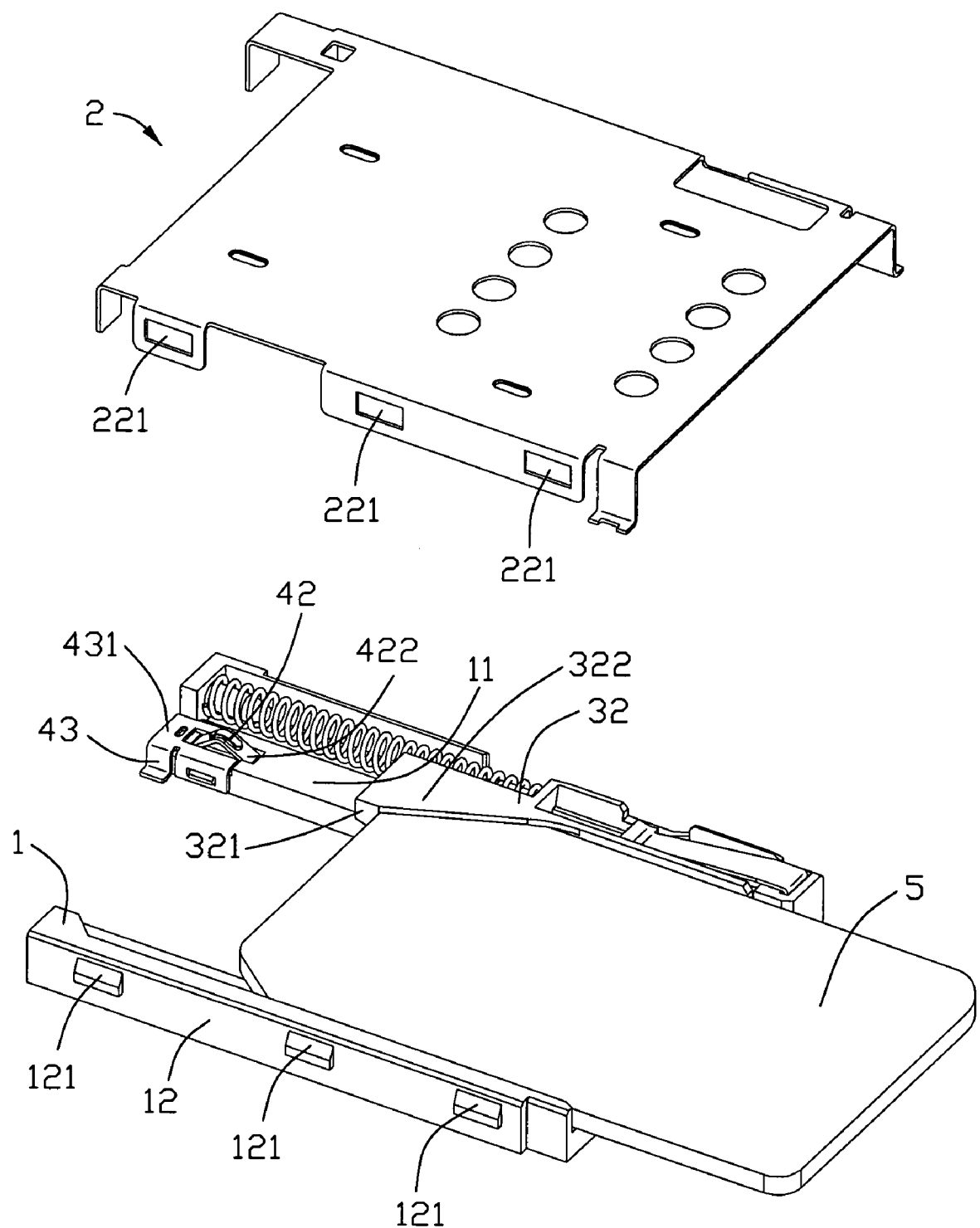
FIG. 3 is a perspective view of the card connector shown in FIG. 1 with a shield plate removed.

Further Joining with FIG. 3, the ejector 3 is assembled on one supporting arm 12 of the insulative housing 1, and comprises a resilient member 31 (in present embodiment, the resilient member is a spring), a slider 32 and a pole (not shown). The resilient member 31 located on the supporting arm 12 has two ends, the one end is locked with the supporting arm, and the other end is locked with the slider 32. The slider is moveably assembled on the supporting arm 12, and has an approximate triangular plate 322 extending into the receiving slot 13. The triangular plate 322 has a horizontal portion (not labeled) and a stopping portion 321 extending downwardly from the horizontal portion. When the card is inserted, the stopping portion 321 engages with a front edge of the card and moves subject to the card moving, and the triangular plate located between the card and the shield plate 2 for avoiding the card directly contacting with the shield plate 2.

The approximately U-shaped terminals are received in corresponding receiving channels of the insulative housing 1, and each comprises a base portion 411, a curved contacting portion 412, a U-shaped connecting portion (not labeled) connecting the base portion 411 and the contacting portion 412. The base portion 411 comprises a soldering portion (not labeled) at a end thereof. Essentially, the contacting portion 412 is located above the base portion 411, and has a resisting portion 413 at a distal end thereof. Furthermore, the contacting portion 412 is resilient. After assembled on the insulative housing, each contacting portion 412 is exposed out of the top surface of the main body 11 of the housing 1 with the resisting portion 413 engaging with the edges of the receiving channels 111.

Figure 4:
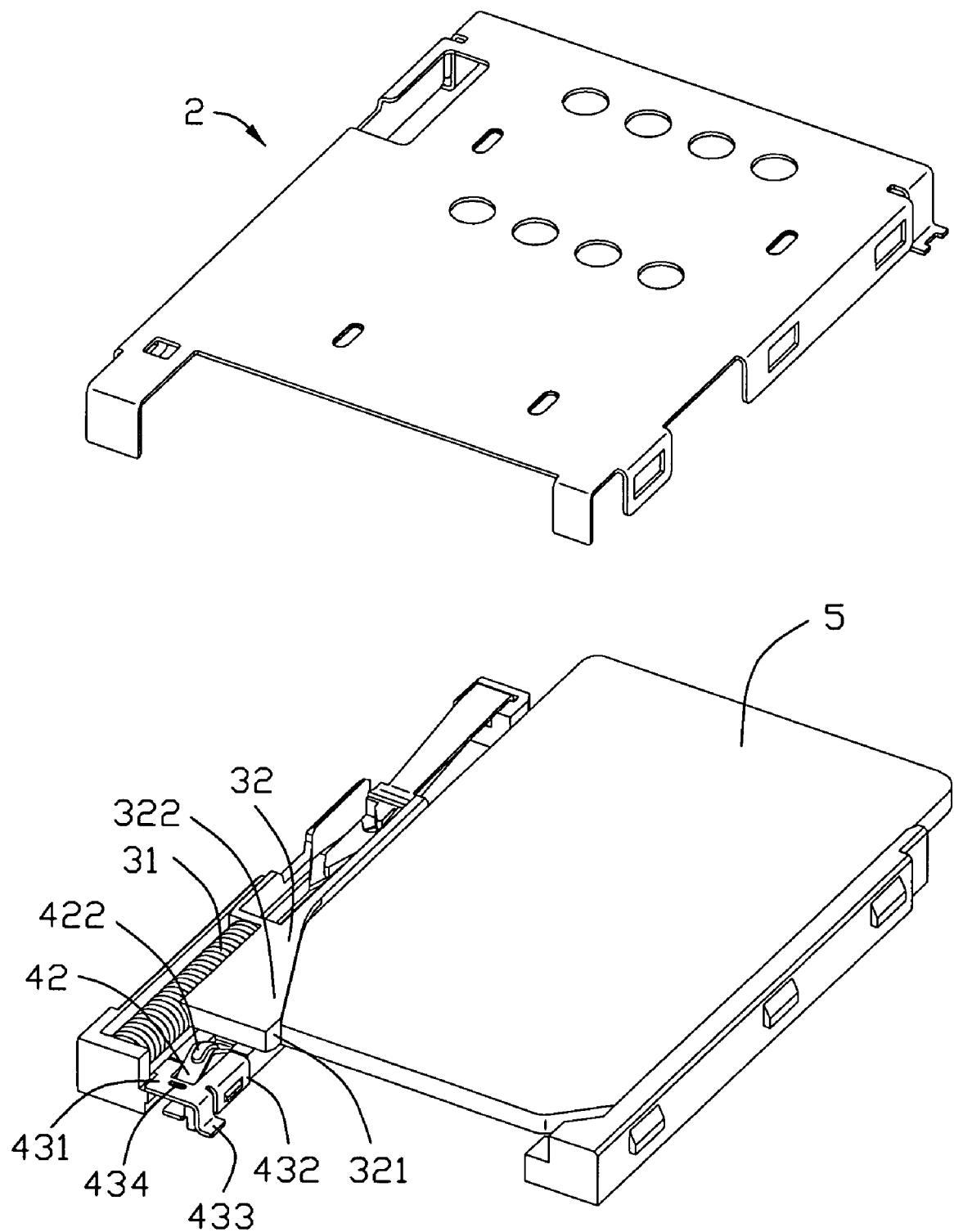
FIG. 4 is a view similar to FIG. 3, but taken from a different aspect.
Figure 5:
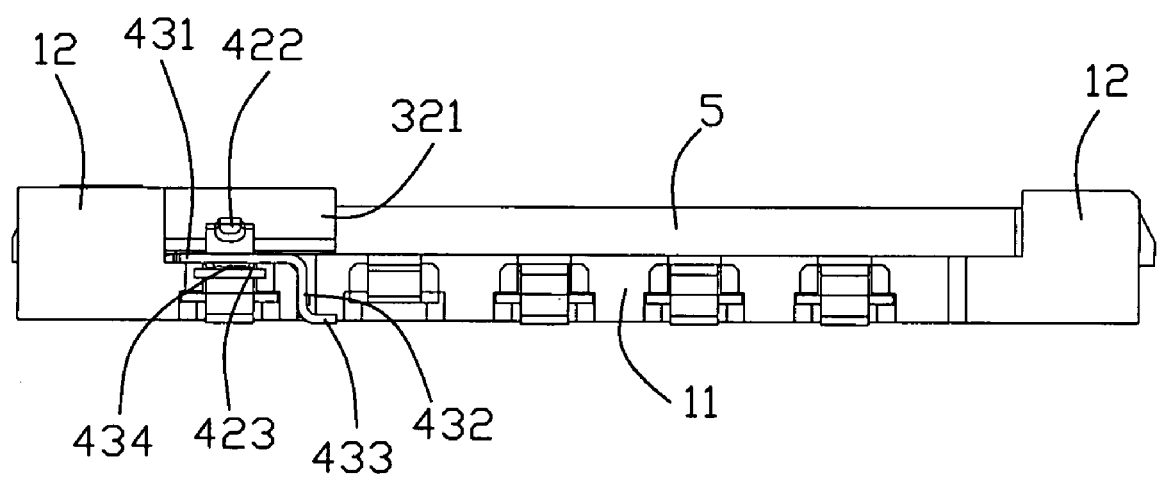
FIG. 5 is a front view of the card connector shown in FIG. 1.

Referring to FIGS. 3 and 4, the detecting switch comprises a U-shaped active pin 42 and a passive pin 43. The active pin 42 is placed in the receiving hole 112 of the insulative housing 1 and has the same structure with terminals 41. The active pin 42 comprises a base part 421, a curved part 422, a U-shaped connecting part (not labeled) connecting the base part 421 and the curved part 422, and a engaging part 423 extending from the distal end of the curved part 422 opposite to the connecting part. Similarly, the curved part 422 projects the top surface of the main body 11. The receiving hole 112 is partially surrounded by the passive pin 43. The passive pin 43 comprises a horizontal plate 431 with a cutout (not labeled), a perpendicular plate 432 extending downwardly from one edge of the horizontal plate 431, and a grounding plate 433 horizontally extending from the perpendicular plate 432 for electrically connecting with the PCB. The horizontal plate 432 forms a rib 434 on a bottom surface thereof. The cutout of the horizontal 432 is overlapped on the receiving hole 112 with the curved part 422 of the active pin 42 projecting therethrough. The engaging part 423 of active pin 42 electrically and mechanically engages with the rib 434 of the passive pin 43 (shown in FIG. 5).

Originally, the engaging part 423 of the active pin 42 electrically and mechanically engages with the rib 434 of the passive pin 43. During the card inserted, the contacting portions of the terminals 41 are electrically connecting with the card in turn along a card inserting direction. And then, the card engages with the stopping portion 321, and pushes the stopping portion 321 moving along the card inserting direction. When the card is on a right position, the stopping portion 321 resists with curved part 422 of the active pin 42 and forces the active pin 42 moving downwardly, accordingly, the engaging part 423 of the active pin 42 is electrically and mechanically separated from the rib 434 of the passive pin 43. When the card is ejected, the stopping plate 321 resumes to the original position by the resilient member 31 pushing the slider 32, accordingly, the active pin 42 also resumes to the original position after the force is disappeared, and electrically and mechanically reconnect with the passive pin 43. Thereby, the metal detecting switch works on without contacting the card, and the abrasion to the card is avoided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector mounted on a printed circuit board, comprising:
   an insulative housing receiving a plurality of terminals;
   a shield plate assembled on the insulative housing and defining a receiving slot with the insulative housing for receiving a card;
   an ejector coupled to the insulative housing, the ejector comprising a resilient member and a movable slider connecting with the resilient member, the slider having a triangular plate extending into the receiving slot and being capable of moving along a card inserting direction by the card; and
   a detecting switch assembled on the insulative housing and having a passive pin and an active pin, the active pin having a resilient curved part projecting into a moving track of the triangular plate, and the curved part being capable of moving by the triangular plate between an upper position where the active pin electrically and mechanically connects with the passive pin and a lower position where the active pin electrically and mechanically disconnects from the passive pin;
   wherein the insulative housing defines a receiving hole at a distal end thereof, and said active pin of detecting switch is received in the receiving hole, and the passive pin has a cutout overlapped on the receiving hole, and the curved part of active pin moveably projects through the cutout.

2. The card connector as described in claim 1, wherein the passive pin comprises a rib on a bottom surface thereof, and the curved part of the active pin has an engaging part extending from a distal end thereof and moving between an original position where the active pin engages with the rib of the passive pin and a final position where the active pin is separate from the rib of the passive pin.

3. The card connector as described in claim 1, wherein the active pin has a same structure with the terminals.

4. The card connector as described in claim 1, wherein the terminals are arranged in two rows.

5. The card connector as described in claim 1, wherein the insulative housing has an approximately U-shaped main body, and the terminals and the detecting switch are assembled on the main body.

6. The card connector as described in claim 1, wherein the triangular plate comprises a horizontal portion and a stopping portion extending from the horizontal portion.

7. The card connector as described in claim 6, wherein when the card is inserted, the horizontal portion is located between the card and the shield plate.

8. The card connector as described in claim 6, wherein, when the card is inserted, the stopping portion engages with the card.

9. A card connector comprising:
   an insulative housing defining a card received cavity with a card insertion opening communicating with an exterior along a front-to-back direction;
   a plurality of terminals disposed in the housing for engagement with an inserted card;
   an ejector including:
   a slider back and forth moveable relative to the housing along said front-to-back direction, said slider defining an engagement section configured to be abut against by an inserted card, and the slider further including a horizontal portion extending from the engagement section to cover partly the inserted card;
   a spring urging the slider to an outward position for ejecting the inserted card; and
   a switch device located around a rear end of the housing far from said card insertion opening; wherein
   said switch device includes a ground contact and a deflectable active contact which can be deflected by the slider when said slider is moved to an inner position so as to activate the switch device.

10. The card connector as claimed in claim 9, wherein said active contact is deflectable in a vertical direction.

11. The card connector as claimed in claim 9, wherein said active contact is assembled to the housing upwardly.

12. The card connector as claimed in claim 9, wherein said ground contact is constantly electrically and mechanically engaged with the active contact when no slider is engaged with the active contact.

13. The card connector as claimed in claim 9, wherein the active contact is configured to be similar to the terminals.

14. A card connector comprising:

an insulative housing defining a card received cavity with a card insertion opening communicating with an exterior along a front-to-back direction;

a plurality of terminals disposed in the housing for engagement with an inserted card;

an ejector including:

a slider back and forth moveable relative to the housing along said front-to-back direction, said slider defining an engagement section configured to be ready to be abut against by an inserted card;

a spring urging the slider to an outward position for ejecting the inserted card; and a switch device located around a rear end of the housing far from said card insertion opening; wherein said switch device includes a ground contact and a deflectable active contact which can be deflected by the slider when said slider is moved to an inner position so as to activate the switch device; wherein the engagement section defines an inner vertical engagement face to engage a vertical front edge of the inserted card which extends in a transverse direction and is perpendicular to the front-to-back direction under a condition that the inserted card is fully located behind the engagement section.

15. The card connector as claimed in claim 14, wherein said active contact is deflectable in a vertical direction.

16. The card connector as claimed in claim 14, wherein said active contact is assembled to the housing upwardly.

17. The card connector as claimed in claim 14, wherein said ground contact is constantly electrically and mechanically engaged with the active contact when no slider is engaged with the active contact.

18. The card connector as claimed in claim 14, wherein the active contact is configured to be similar to the terminals.

\* \* \* \* \*